United States Patent
Ebrahimi

(10) Patent No.: US 10,605,278 B2
(45) Date of Patent: Mar. 31, 2020

(54) HYDRAULIC LEAK DETECTION SYSTEM

(71) Applicant: Mohammad Ebrahimi, Isfahan (IR)

(72) Inventor: Mohammad Ebrahimi, Isfahan (IR)

( * ) Notice: Subject to any disclaimer, the term of this patent is extended or adjusted under 35 U.S.C. 154(b) by 80 days.

(21) Appl. No.: 15/936,793

(22) Filed: Mar. 27, 2018

(65) Prior Publication Data

US 2018/0223881 A1     Aug. 9, 2018

Related U.S. Application Data

(60) Provisional application No. 62/476,877, filed on Mar. 27, 2017.

(51) Int. Cl.
*F15B 20/00* (2006.01)
*G01M 3/26* (2006.01)
*F15B 19/00* (2006.01)

(52) U.S. Cl.
CPC .......... *F15B 20/005* (2013.01); *F15B 19/005* (2013.01); *F15B 20/008* (2013.01); *G01M 3/26* (2013.01); *F15B 2211/30565* (2013.01); *F15B 2211/411* (2013.01); *F15B 2211/41509* (2013.01); *F15B 2211/426* (2013.01); *F15B 2211/632* (2013.01)

(58) Field of Classification Search
CPC ...... F15B 20/005; F15B 19/005; F15B 20/00; F15B 20/008; F17D 5/02; G01M 3/26
See application file for complete search history.

(56) References Cited

U.S. PATENT DOCUMENTS

| | | | | |
|---|---|---|---|---|
| 5,056,554 A | * | 10/1991 | White | E03B 7/12 137/312 |
| 5,187,973 A | * | 2/1993 | Kunze et al. | F17D 5/00 73/40.5 R |
| 5,568,825 A | | 10/1996 | Faulk | |
| 5,748,077 A | | 5/1998 | Brandt | |
| 7,409,825 B2 | * | 8/2008 | Stephenson | B66F 17/003 60/403 |
| 9,255,649 B2 | | 2/2016 | Coleman et al. | |
| 9,506,465 B2 | * | 11/2016 | Dybing et al. | F15B 13/06 |
| 2005/0234660 A1 | * | 10/2005 | Kambli et al. | F15B 19/005 702/51 |
| 2011/0056192 A1 | * | 3/2011 | Weber et al. | E02F 9/2242 60/327 |
| 2013/0174649 A1 | | 7/2013 | Hains et al. | |

* cited by examiner

*Primary Examiner* — Kevin L Lee
(74) *Attorney, Agent, or Firm* — Bajwa IP Law Firm; Haris Zaheer Bajwa

(57) ABSTRACT

A system for detecting leaks in a hydraulic supply system for a double-acting hydraulic actuator is disclosed. The system may include a first conduit in fluid communication with a first chamber of the actuator, and with a second chamber of the actuator, and a directional control valve coupled with the first conduit and the second conduit. A directional control valve may be in fluid communication with a hydraulic oil supply line and may switch between the hydraulic oil being sent and received via the first conduit and second conduit. A valve can be associated with the oil supply line. A first and second flow meter can generate a first signal and a second signal, respectively, indicating flow rate within the first conduit and the second conduit. A controller may receive the first signal and the second signal, calculate their ratio, and cause the valve to inhibit flow within the oil supply line upon the ratio differing from a given ratio by more than a predetermined threshold.

10 Claims, 6 Drawing Sheets

HYDRAULIC LEAK DETECTION SYSTEM

CROSS-REFERENCE TO RELATED APPLICATION

This application claims the benefit of priority from U.S. Provisional Patent Application Ser. No. 62/476,877, filed on Mar. 27, 2017, and entitled "HYDRAULIC LEAK DETECTOR VALVE," which is incorporated herein by reference in its entirety.

TECHNICAL FIELD

The present disclosure generally relates to hydraulic leak detection systems, and particularly to hydraulic leak detection and shutoff valves.

BACKGROUND

Flow can escape from a hydraulic circuit through external or internal leakage. External leakage such as a burst hose can be easy to find. Internal leakage can occur in the pump, valves or actuators and can be more difficult to isolate. The detection and isolation of hydraulic oil leakage can be an economic and safety challenge in the field of hydraulics. For example, as a hydraulic actuator is used over time, the piston seal that closes the gap between the moveable piston and the cylinder wall wears. This results in the hydraulic oil eventually being able to flow around the piston and between the cylinder chambers. Although no hydraulic oil is lost from the hydraulic circuit, the dynamic performance of the hydraulic system is affected, since only a portion of the flow delivered to the actuator is available to move the piston against the load. Therefore, there is a need for the development of reliable techniques and systems for leak detection and isolation in hydraulic systems.

SUMMARY

In one general aspect, a system for detecting leaks in a hydraulic supply system for a double-acting hydraulic actuator is disclosed. The double-acting hydraulic actuator may include a first chamber and a second chamber, separated and defined by a piston movable in two directions responsive to relative magnitudes of hydraulic oil pressure in the first chamber and the second chamber. The disclosed system may include a first conduit in fluid communication with the first chamber, a second conduit in fluid communication with the second chamber of the actuator, and a directional control valve coupled with the first conduit and the second conduit. The directional control valve may be in fluid communication with a hydraulic oil supply line and it may alternately allow the hydraulic oil to be sent and received via the first conduit and the second conduit. The system may further include a first valve associated with the oil supply line, a first flow meter associated with the first conduit that may be configured to produce a first signal representative of flow rate within the first conduit, and a second flow meter that may be configured to produce a second signal representative of flow rate within the second conduit. The system may further include a controller that may be configured to receive the first signal and the second signal. The controller may further be configured to calculate a first ratio of the first signal to the second signal, determine a first difference between the first ratio and a predetermined ratio, and cause the first valve to inhibit flow within the oil supply line in response to the first difference exceeding a predetermined threshold value.

According to some implementations, the first flow meter may include a first flow meter chamber in fluid communication with the first conduit, a first flow meter piston that may be disposed within the first flow meter chamber and movable in two directions responsive to a direction of drag force exerted by hydraulic oil flow through the first flow meter chamber, and a first linear displacement sensor that may be coupled with the first flow meter piston. In some implementations, the first linear displacement sensor may be configured to determine a relative position of the first flow meter piston within the first flow meter chamber and produce the first signal representative of the relative position of the first piston.

According to an implementation, the first linear displacement sensor may include a linear potentiometer. According to another implementation, the first linear displacement sensor may include a linear variable differential transformer.

According to some implementations, the second flow meter may include a second flow meter chamber in fluid communication with the second conduit, a second flow meter piston that may be disposed within the second flow meter chamber and movable in two directions responsive to a direction of drag force exerted by hydraulic oil flow through the second flow meter chamber, and a second linear displacement sensor that may be coupled with the second flow meter piston. In some implementations, the second flow meter linear displacement sensor may be configured to determine a relative position of the second flow meter piston within the second flow meter chamber and produce the second signal representative of the relative position of the second flow meter piston.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

The following disclosure describes techniques and systems for detecting leaks in hydraulic supply systems for double-acting hydraulic actuators. Disclosed systems and methods for leak detection can include comparing the flow signals produced at both sides of a double-acting hydraulic actuator, in combination with controlling flow within the hydraulic supply system based at least in part on the comparison. In an implementation, methods can include inhibiting, or other control of hydraulic flow, based at least in part on a ratio or other relation of the flow signals. For example, control of hydraulic flow can include a cut-off of the flow upon a ratio of the flow signals exceeding a predetermined threshold value. The disclosed systems and methods may include two conduits, each in fluid communication with a respective chamber of the double-acting hydraulic actuator, two flow sensors associated with the two conduits measuring and producing signals representative of the flow rates within the two conduits. The disclosed systems and methods may further include a controller that may be configured to calculate a ratio between the flow signals produced by the two flow sensors and cut off the flow to the two conduits in response to the calculated ratio exceeding a preset threshold value.

Figure 1:
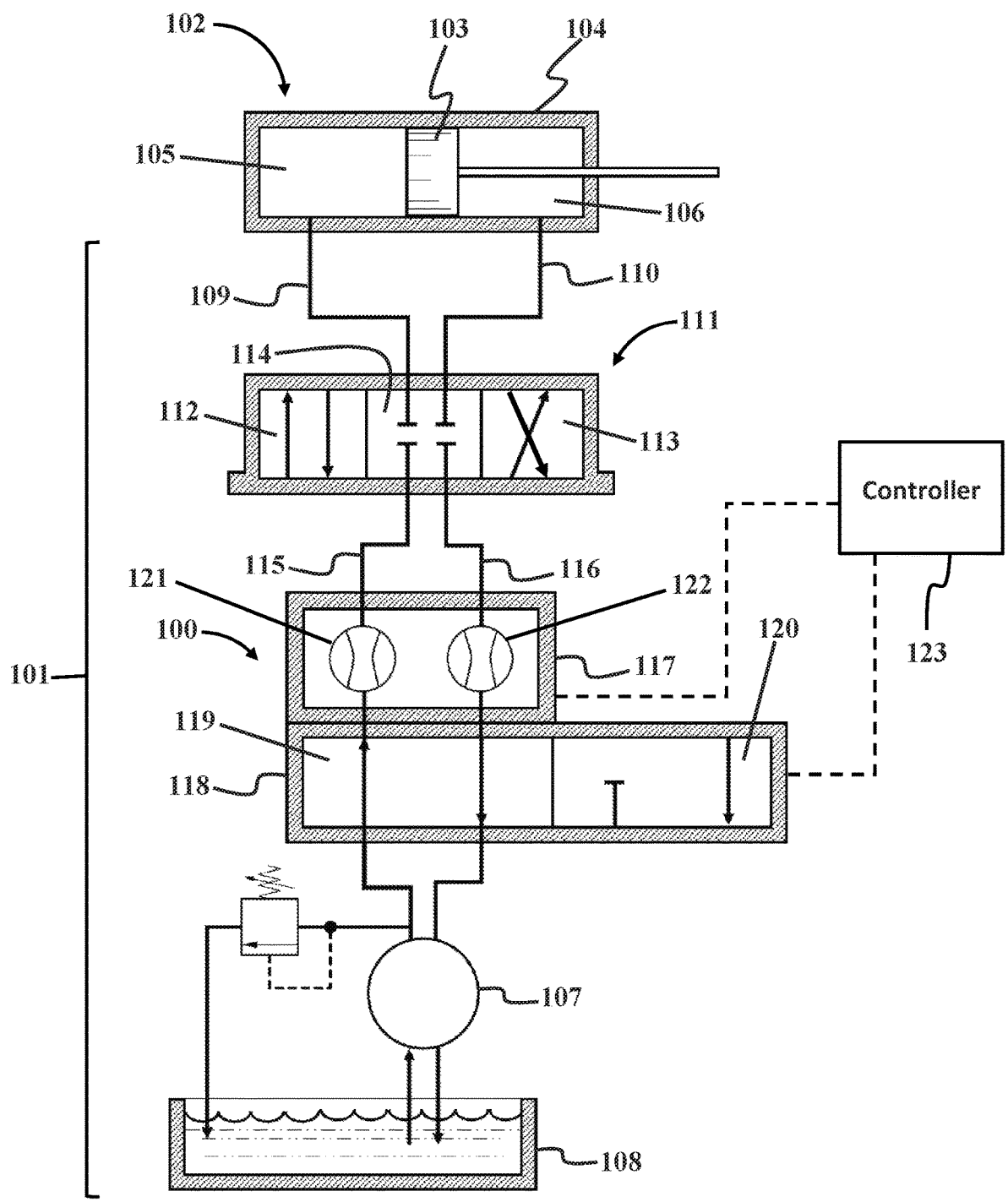
FIG. 1 is a schematic representation of one implementation of a hydraulic leak detection device utilized in a hydraulic supply system of a double-acting hydraulic actuator.

FIG. 1 is a schematic representation of one implementation of hydraulic leak detection device 100 utilized in hydraulic supply system 101 of double-acting hydraulic actuator 102. Double-acting hydraulic actuator 102 may include a hydraulically responsive element, such as a piston 103, disposed within a cylinder 104. Opposite sides of the piston 103 can respectively define, in an interior of the cylinder 104, a first chamber 105 and a second chamber 106. Piston 103 is movable in two directions in response to relative magnitudes of hydraulic oil pressure in the first chamber 105 and the second chamber 106. A pump 107 may be associated with a reservoir 108 to draw hydraulic oil from the reservoir 108 and into the pump 107, and also to return the hydraulic oil to the reservoir 108. Pump 107 may be in an indirect fluid communication with the first chamber 105 and the second chamber 106, via two conduits, labeled 109 and 110, with conduit 109 being to the first chamber 105 and conduit 110 being to the second chamber 106. A directional control valve 111 may be connected in fluid communication between two conduits 109, 110 and pump 107. Directional control valve 111 can have a first position 112 and a second position 113, and can be configured to selectively switch between the first position 112 and the second position 113, for example, based on a controller signal. In an implementation, the first position 112 causes pressurized hydraulic oil from the pump 107 to flow into the first chamber 105, and enables hydraulic oil to flow from the second chamber 106 back to the pump 107 for return to the reservoir 108. The second position 113 causes pressurized hydraulic oil from pump 107 to flow into the second chamber 106, and enables hydraulic oil to flow from the first chamber 105 back to the pump 107 for return to the reservoir 108. In an implementation, a mechanism such as a third position 114 can be provided to prevent hydraulic oil flow in either direction.

Referring to FIG. 1, in an implementation, hydraulic leak detection device 100 may be connected in fluid communication between pump 107 and a first conduit 115 and a second conduit 116. Hydraulic leak detection device 100 may include a sensor section 117 and a shut-off valve 118. Sensor section 117 may be configured to produce flow signals representative of flow rates in the first conduit 115 and the second conduit 116. The shut-off valve 118 may be configured to control flow within the first conduit 115, based at least in part on the above-described flow signals. In one exemplary implementation, the shut-off valve 118 can be configured to inhibit flow within first conduit 115 in response to a condition of the flow signals, for example, to inhibit flow based at least in part on a ratio of the flow signals exceeding a predetermined threshold value. Shut-off valve 118 can have a normal position 119 and a closed position 120. The normal position 119 can allow pressurized hydraulic oil from pump 107 to flow into the first conduit 115 and allow the hydraulic oil to return to reservoir 108 via second conduit 116. The closed position 120, in contrast, can inhibit pressurized hydraulic oil from the pump 107 from flowing into the first conduit 115. In an implementation, in the event of a hydraulic leak in hydraulic supply system 101, the sensor section 117 can detect the hydraulic leak via the flow signals that, as described above, are representative of the flow rates in the first conduit 115 and second conduit 116. In one example, the second section 117 can be implemented to detect the hydraulic leakage based at least in part on a comparing of, or other calculation using, the two flow signals and, further based on a result of the comparing or other calculation meeting a condition, to urge the shut-off valve 118 to cut the pressurized hydraulic oil flow from pump 107 toward actuator 102, which can isolate the leakage.

With further reference to FIG. 1, in an implementation, sensor section 117 may include a first flow meter 121 associated with the first conduit 115 and a second flow meter 122 associated with the second conduit 116. First flow meter 121 may be configured to produce a first flow signal representative of the flow rate within the first conduit 115. The first flow signal is representative of the flow rate at which hydraulic oil is delivered to actuator 102. Second flow meter 122 may be configured to produce a second flow signal representative of the flow rate within the second conduit 116. The second flow signal is representative of the flow rate at which hydraulic oil is returned to reservoir 108. In normal operating conditions of actuator 102, the ratio between the flow rate at which the hydraulic oil is delivered to actuator 102 and the flow rate at which the hydraulic oil is returned to reservoir 108 remains constant. However in the event of a leakage in the system, this ratio exceeds its normal condition value by a certain amount or extent. Sensor section 117 may detect a leakage in the system by comparing a first ratio of (first flow signal:second flow signal) to a normal condition ratio. In an aspect, the sensor section 117 can indicate a leakage when the first ratio differs from the normal condition ratio by more than a threshold value. In a further aspect, implementation can include a capability to adjust the threshold value. For example, the threshold value can be adjustable by a user. According to an implementation, sensor section 117 may further include a controller 123 that receives the first flow signal and the second flow signal. The controller 123 may be configured to calculate the ratio of the first flow signal to the second flow signal, determine a first difference between the calculated first ratio and a predetermined normal ratio, and cause shut-off valve 118 to inhibit flow within the first conduit 115 in response to the first difference exceeding a predetermined ratio.

Figure 2A:
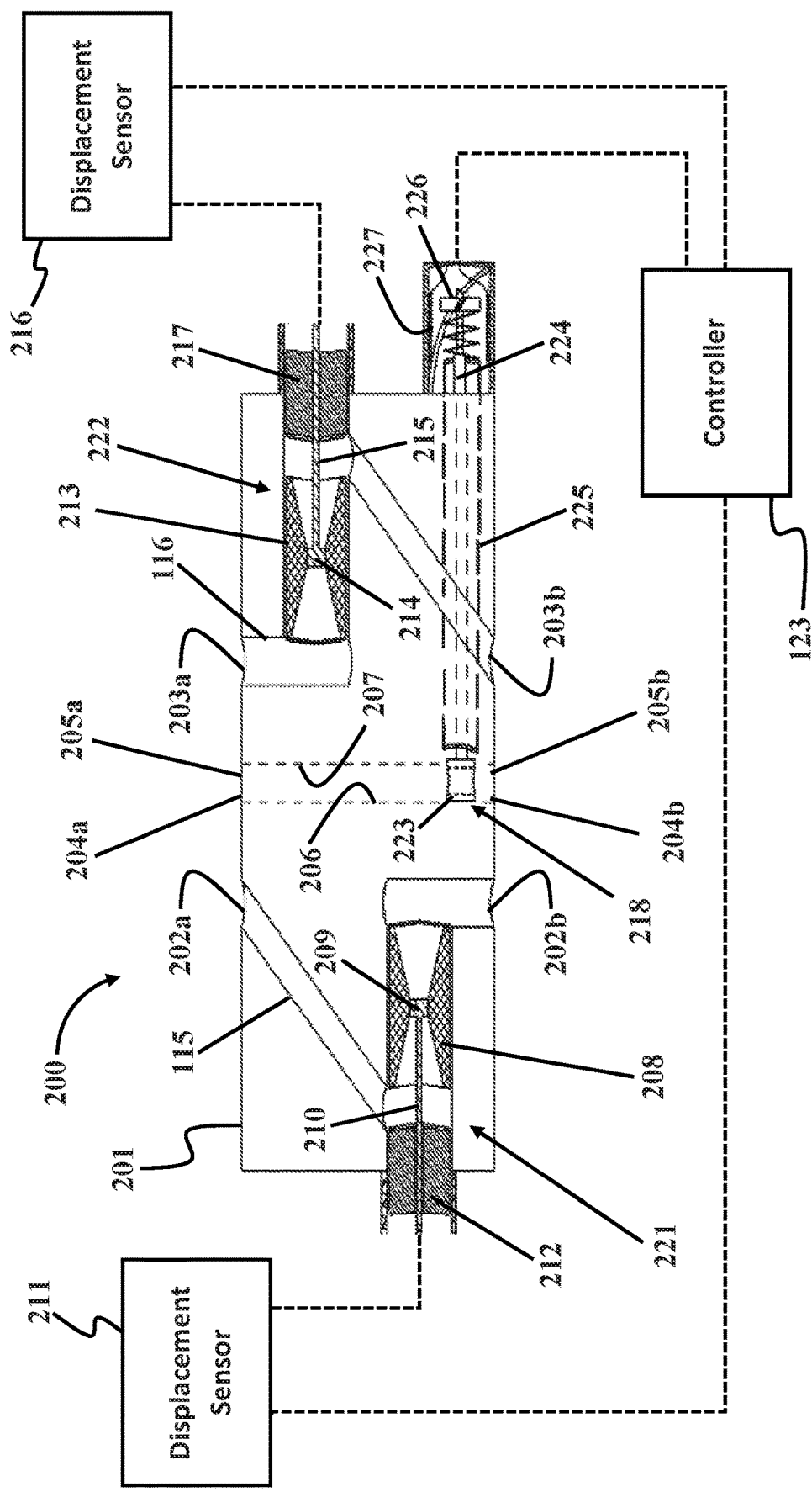
FIG. 2A is a schematic representation of one implementation of a hydraulic leak detection device.

FIG. 2A is a schematic representation of one implementation of hydraulic leak detection device 200. Hydraulic leak detection device 200 may be configured to be an implementation of hydraulic leak detection device 100 of FIG. 1. Hydraulic leak detection device 200 may include a block 201 with four sets of inlet and outlet ports 202a-b, 203a-b, 204a-b, and 205a-b. First conduit 115 and second conduit 116 are formed inside block 201 with ports 202a-b functioning as inlet and/or outlet ports of first conduit 115, and ports 203a-b functioning as inlet and\or outlet ports of second conduit 116. A pressurized oil supply line 206 and a return line 207 are further created in block 201 (FIG. 2A shows the pressurized oil supply line 206 and return line 207 superimposed). Ports 204a and 204b can function as outlet and inlet of pressurized oil supply line 206, respectively, and ports 205a and 205b can function as inlet and outlet of return line 207, respectively. The pressurized oil supply line 206 and return line 207 can be connected in fluid communication between pump 107 (not visible in FIG. 2A) and directional control valve 111 (not visible in FIG. 2A). First conduit 115 and second conduit 116 can be connected in fluid communication between the directional control valve 111 and actuator 102. It should be understood that hydraulic oil may flow in either direction (i.e., supply direction or return direction) in both the first conduit 115 and the second conduit 116.

With reference to FIG. 2A, in an implementation, a first flow meter 221 may be disposed in the path of first conduit 115. First flow meter 221 may be configured to be an implementation of first flow meter 121 of FIG. 1. First flow meter 221 may include a first hourglass-shaped opening 208 that may be created in the path of the first conduit 115. First flow meter 221 may further include a first flow meter piston 209 that may be disposed within the first hourglass-shaped opening 208. Hydraulic oil flow through the first conduit 115 and first hourglass-shaped opening 208 exerts a drag force on the first flow meter piston 209, moving the first flow meter piston 209 in the flow direction. First flow meter piston 209 can be secured at a distal end of a first rod 210, and the first rod 210 can be secured by a first bearing unit 212 to the block 201 such that only a linear movement of the first flow meter piston 209 and the first rod 210 is allowed. Therefore, depending on the flow direction in the first conduit 115, the first flow meter piston 209 may linearly move back or forth. According to an implementation, a first displacement sensor 211, which may be a linear potentiometer or a linear variable differential transformer (LVDT), may be coupled to the first rod 210 and may be configured to determine the linear displacement of the first flow meter piston 209. Controller 123 may then receive a first flow signal from the first displacement sensor 211 that is representative of the displacement of the first flow meter piston 209 by the drag force exerted by the hydraulic oil. The displacement of the first flow meter piston 209 may be representative of the flow rate of the hydraulic oil passing through the first conduit 115.

With further reference to FIG. 2A, in an implementation, a second flow meter 222 may be disposed in the path of the second conduit 116. Second flow meter 222 may be configured to be an implementation of second flow meter 122 of FIG. 1. Second flow meter 222 may include a second hourglass-shaped opening 213 that may be created in the path of the second conduit 116. Second flow meter 222 may further include a second flow meter piston 214 that may be disposed within the second hourglass-shaped opening 213. Hydraulic oil flow through the second conduit 116 and the second hourglass-shaped opening 213 exerts a drag force on the second flow meter piston 214, moving the piston 214 in the flow direction. Second flow meter piston 214 is secured at a distal end of a second rod 215, and the second rod 215 is secured by a second bearing unit 217 to the block 201, such that only a linear movement of the second flow meter piston 214 and the second rod 215 is allowed. Therefore, depending on the flow direction in the second conduit 116, the second piston 214 may linearly move back or forth. According to an implementation, a second displacement sensor 216, which may be a linear potentiometer or an LVDT, may be coupled with the second rod 215 and may be configured to determine the linear displacement of the second flow meter piston 214. Controller 123 may receive a second flow signal from the second displacement sensor 216 that is representative of the displacement of the second flow meter piston 214 by the drag force exerted by the hydraulic oil. The displacement of the second flow meter piston 214 may be representative of the flow rate of the hydraulic oil passing through the second conduit 116.

With further reference to FIG. 2A, in an implementation, controller 123 may be configured to calculate a ratio of the first signal to the second signal (first signal:second signal). The controller 123 may further include a memory (not explicitly visible in FIG. 2A) receiving and storing a normal ratio of the first signal to the second signal which is indicative that there is no leak in the system. The controller 123 may further be configured to calculate a difference between the ratio and the normal ratio. A shut-off valve 218 similar to shut-off valve 118 of FIG. 1 may be associated with pressurized hydraulic oil supply line 206. Shut-off valve 218 may be functionally coupled to the controller 123 and the controller 123 may be further configured to cause the shut-off valve 118 to inhibit flow within the pressurized hydraulic oil supply line 206 in response to the difference exceeding a predetermined threshold value. The predetermined threshold value may be adjustable by a user, and the value may be stored on the memory of controller 123. Benefit from determining a threshold for the difference is that the shut-off valve 118 will not isolate the leakage and will not cut off the hydraulic oil feed in cases where leakage is negligible. This allows the user to adjust the sensitivity of the hydraulic leak detection device 200 to leakages occurring in the system.

Figure 2B:
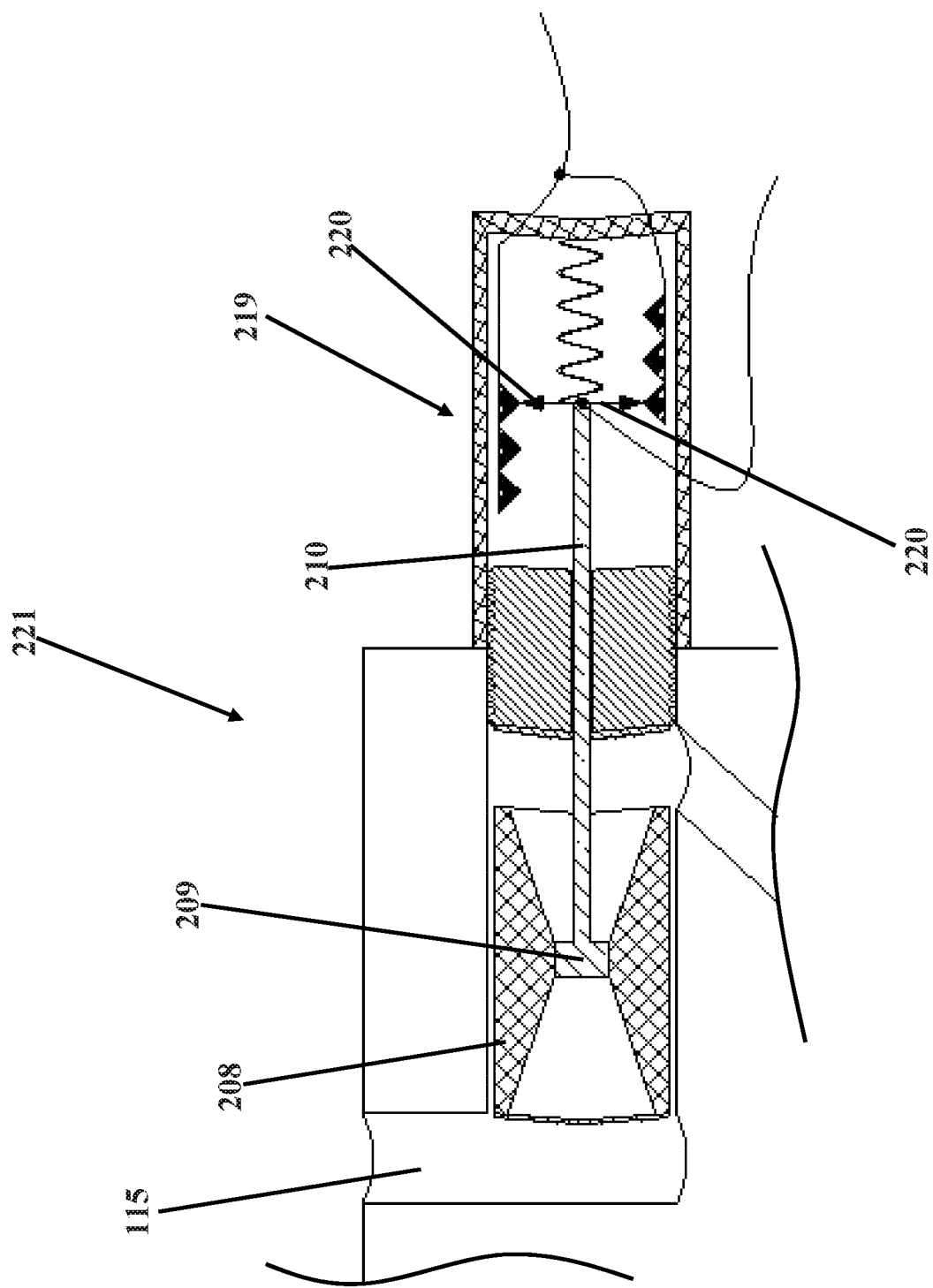
FIG. 2B is a schematic representation of a flow meter, according to an implementation of the present disclosure.

FIG. 2B is a schematic representation of an implementation of first flow meter 221. Referring to FIG. 2B, the displacement of first flow meter piston 209 within first hourglass-shaped opening 208 may be determined by a linear potentiometer 219 coupled with the first rod 210. As shown in FIG. 2B, linear potentiometer 219 may include a variable resistor coupled with proximal end of the first rod 210 by sliding contacts 220. The variable resistor with the sliding contacts 220 forms an adjustable voltage divider that produces an electric signal based on the displacement of the sliding contact 220 in response to the displacement of the first rod 210. This way the displacement of the first flow meter piston 209 creates an electrical signal that is indicative of the flow rate at which the hydraulic oil passes through the first conduit 115, in either direction.

Referring back to FIG. 2A, shut-off valve 218 may be a plug valve including, for example, a plug 223 disposed within pressurized hydraulic oil supply line 206. Plug 223 may be actuated by a valve rod 224 disposed within a cylindrical opening 225 in block 201. The valve rod 224 may be coupled with a bobbin 226, which can be actuated to move back and forth along the longitudinal axis LX of the cylindrical opening 225 by a winding 227 energized by controller 123. Upon detection of a leakage by the controller 123, the controller 123 sends an electric trigger signal to the winding 227 and, in response, the winding 227 causes the bobbin 226 to linearly move into the cylindrical opening 225. By operation of a linear-to-rotational transforming mechanism, described in greater detail in paragraphs that follow, the linear movement of the bobbin 226 may be transformed into a rotational movement of the valve rod 224, which, in turn, rotates the plug 223 to a position at which the plug 223 blocks the path of pressurized hydraulic oil supply line 206.

Figure 2C:
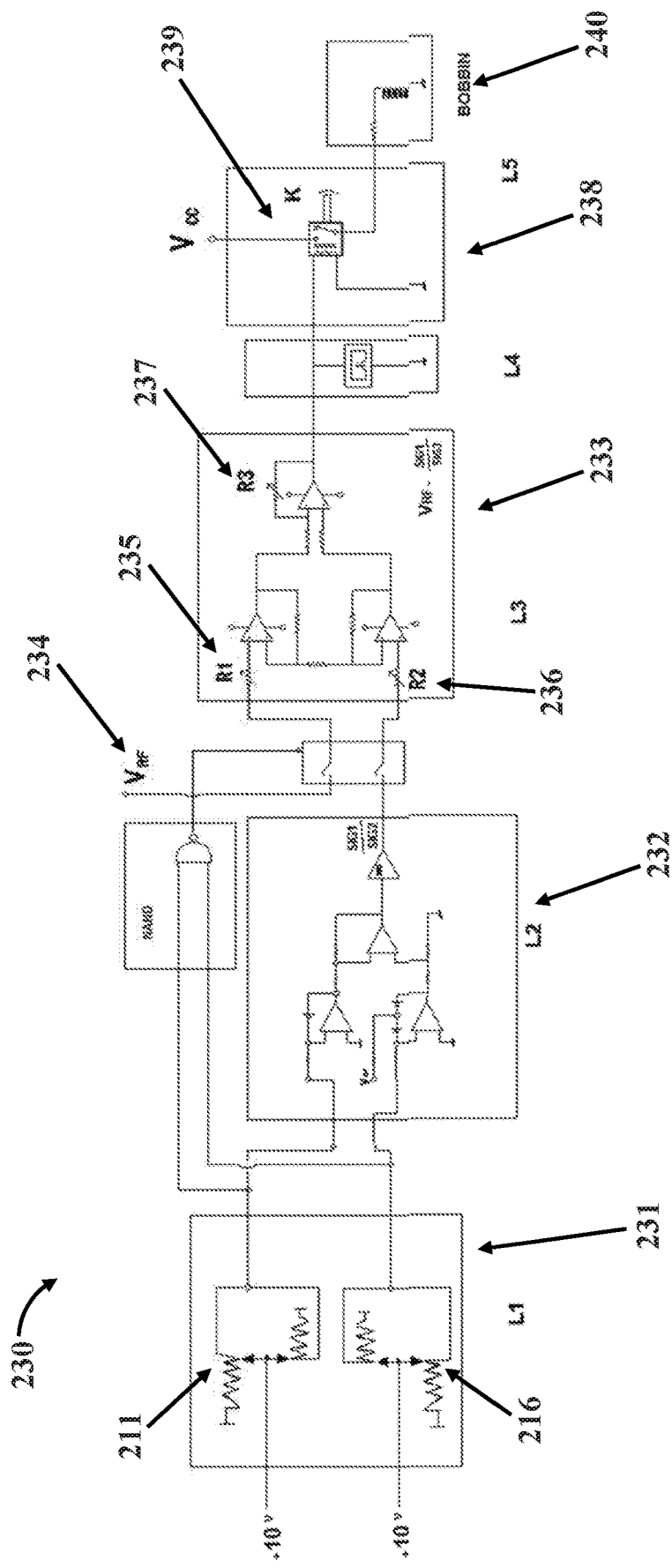
FIG. 2C illustrates an implementation of a controller circuit.

FIG. 2C illustrates an implementation of a controller circuit 230. The controller circuit 230 may include a sensing level 231, where the first displacement sensor 211 and the second displacement sensor 216 generate the first flow signal and the second flow signal, respectively. In an example, the first displacement sensor 211 and the second displacement sensor 216 may be linear potentiometers that generate voltage signals. The first flow signal and the second flow signal may then enter a second level 232 of the controller circuit 230, where a ratio of the first flow signal to the second flow signal may be obtained by dividing the first flow signal to the second flow signal. The ratio of the first flow signal to the second flow signal may then enter a third level 233 of the controller circuit 230 where the ratio is subtracted from a reference voltage 234. In order to calibrate the controller, in the normal operating conditions, where no leak has occurred, a user may change the reference voltage 234 such that the difference between the reference voltage 234 and the ratio becomes zero. The normal condition ratio of the first flow signal to the second flow signal may be changed by changing a first resistor 235 and a second resistor 236 in the third level 233. A third resistor 237 may be utilized for adjusting a threshold value, such that the controller circuit 230 can indicate a leakage when the first ratio differs from the normal condition ratio by more than the threshold value. Controller circuit 230 may further include a fifth level 238 where a contactor 239 may be utilized to send out a trigger signal to the bobbin 240 in case the output signal from the third level 233 deviates from zero by a value larger than the adjusted threshold.

Figure 3A:
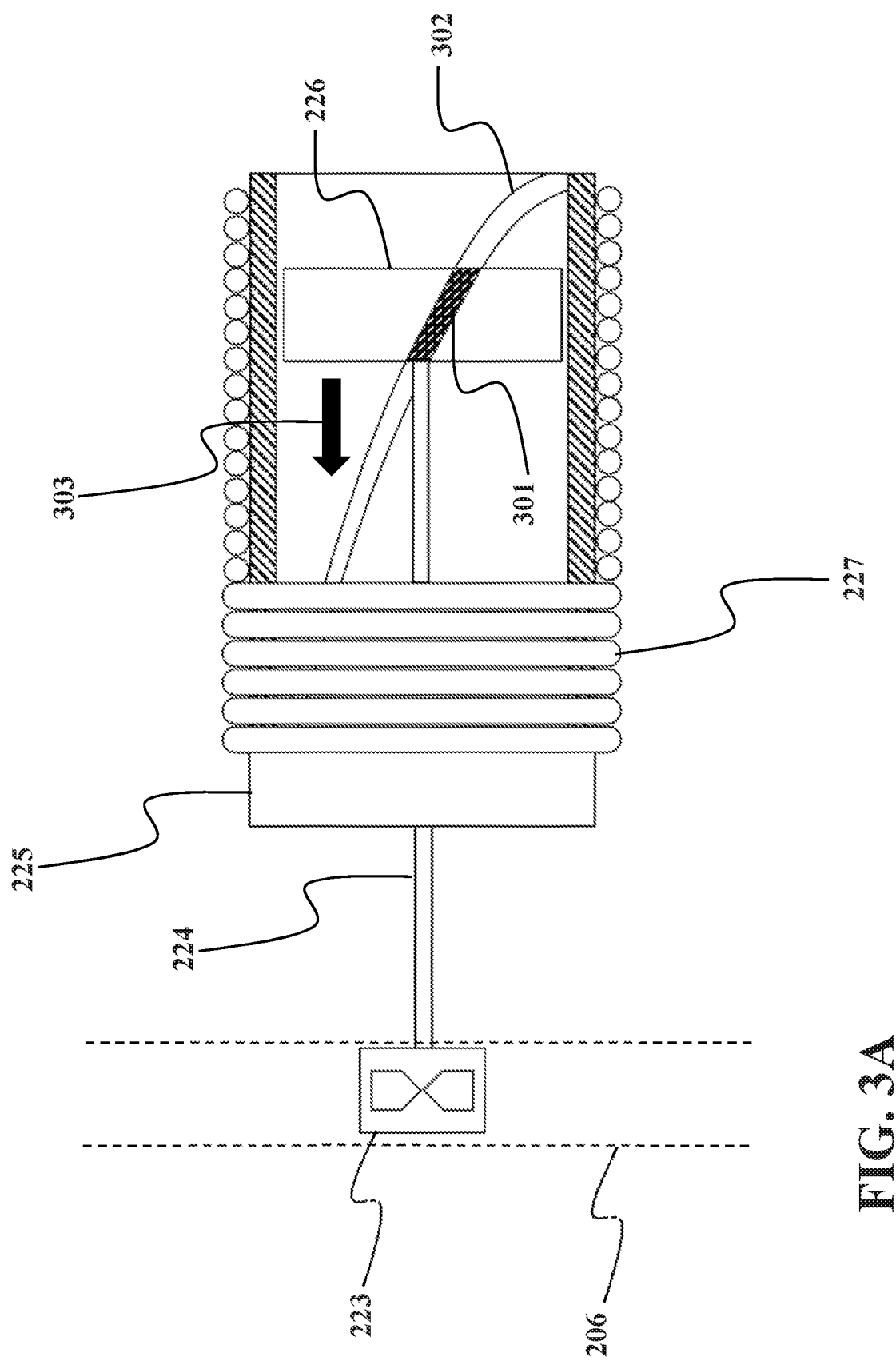
FIG. 3A is a schematic representation of a transforming mechanism, according to an implementation of the present disclosure.
Figure 3B:
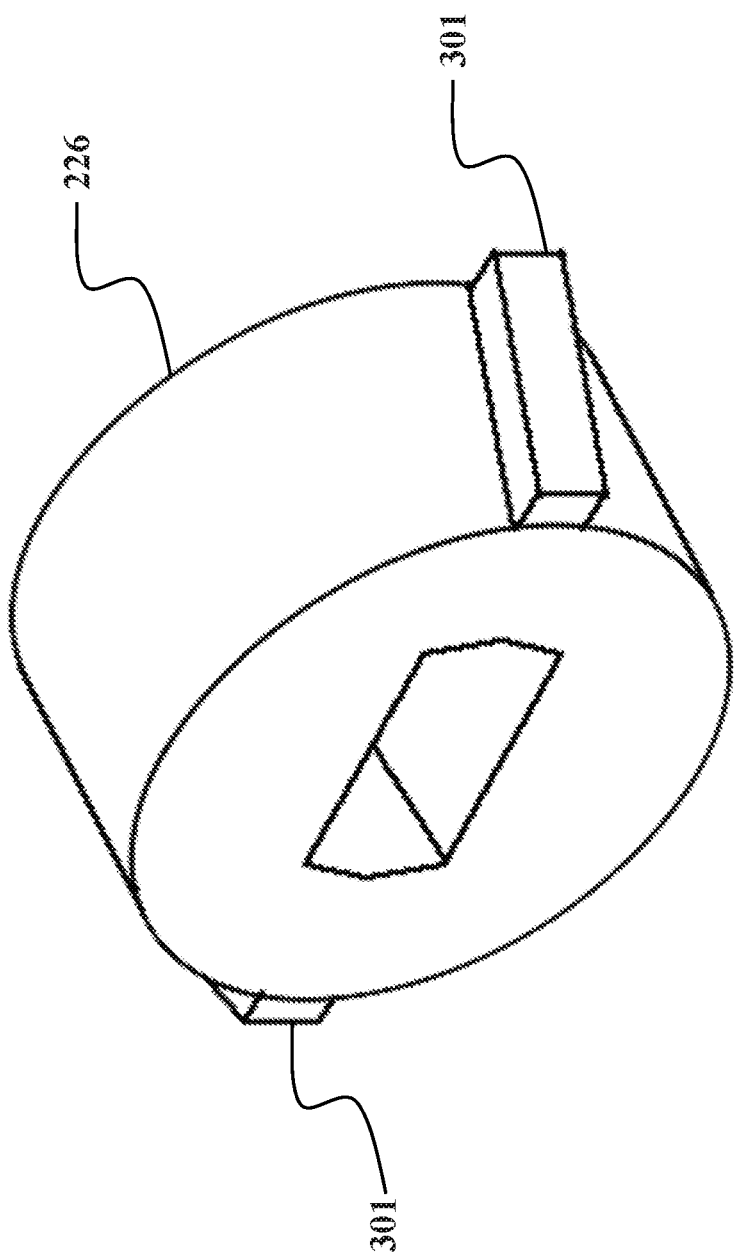
FIG. 3B illustrates an implementation of a bobbin.

FIG. 3A is a schematic representation of a linear-to-rotational transforming mechanism for converting the linear movement of the bobbin 226 into the rotational movement of the valve rod 224. FIG. 3B illustrates an implementation of the bobbin 226. The bobbin 226 can be formed with a generally cylindrical outer surface 226a, aligned with and extending along a linear axis LX'. In an aspect, surface 226a can be dimensioned to cooperate with an inner surface of the cylindrical opening 225 such that, when bobbin 226 is arranged within the cylindrical opening 225, the linear axis LX' of the bobbin 226 is co-linear with the linear axis LX. Referring to FIGS. 3A and 3B, the bobbin 226 may have a slidable engagement passage 228, aligned with the linear axis LX'. The slidable engagement passage 228 can be formed with a geometry and internal dimensioning that, in a projection plane normal to the axis LX', conforms to a cross-sectional geometry and dimensioning of the valve rod 224. The conformance can be such that bobbin 226 can move along the linear axis LX, while the bobbin slidable engagement passage 228 engages the valve rod 224, such that rotation of the bobbin 226 urges rotation of the valve rod 224.

In an implementation, the linear-to-rotational transforming mechanism can include, either integral with, mounted, or secured to the cylindrical outer surface 226a of the bobbin 226, a plurality, for example, two inclined protruding or extended sections 301. The inclined sections 301 can have an incline angle IA. The inclined extended sections 301 can extend or protrude from the generally cylindrical outer surface 226a in an outward direction, to a height (visible in FIG. 3B but not separately numbered). In FIG. 3A-3B implementation, having two extended sections 301, the structures 301 can be positioned opposite one another, i.e., on opposite sides of the cylindrical outer surface 226a. In such an implementation, corresponding to the two extended sections 301, two grooves 302 may be formed on the inner surface of cylindrical opening 225, at opposite sides. The grooves 302 can have a groove depth and width (visible in part in FIG. 3A) slightly greater than the width and height of the two inclined extended sections 301 of the bobbin 226. The grooves 302 can be formed with a pitch angle IB that is the same, or approximately the same as the incline angle IA of extended sections 301. Dimensioned and configured as such, the extended sections 301 can engage and move within the grooves 302. Once the winding 227 is energized by the controller 123, the bobbin 226 linearly moves forward in the direction shown by arrow 303. The movement of the inclined extended sections 301 inside grooves 302 urges a rotation of the bobbin 226 as it moves forward, and its rotating bobbin's slidable engagement passage 228 urges a rotation of the valve rod 224 about the longitudinal axis of the valve rod 224. As the valve rod 224 rotates it causes the plug 223 to rotate to the position at which it blocks the hydraulic oil supply line 206.

While the foregoing has described what are considered to be the best mode and/or other examples, it is understood that various modifications may be made therein and that subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein. Relational terms such as "first" and "second" and the like may be used solely to distinguish one entity or action from another without necessarily requiring or implying any actual such relationship or order between such entities or actions. The terms "comprises," "comprising," or any other variation thereof, as used herein and in the appended claims are intended to cover a non-exclusive inclusion, encompassing a process, method, article, or apparatus that comprises a list of elements that does not include only those elements but may include other elements not expressly listed to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is not intended to be used to interpret or limit the scope or meaning of the claims. In addition, in the foregoing Detailed Description, it can be seen that various features are grouped together in various implementations. Such grouping is for purposes of streamlining this disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into this Detailed Description, with each claim standing on its own as a separately claimed subject matter.

While various implementations have been described, the description is intended to be exemplary, rather than limiting and it will be apparent to those of ordinary skill in the art that many more implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A system for detecting leaks in a hydraulic supply system, the hydraulic supply system connected to a double-acting hydraulic actuator, the system comprising:
    a first conduit in fluid communication with a first chamber of the double-acting hydraulic actuator;
    a second conduit in fluid communication with a second chamber of the double acting hydraulic actuator;
    a directional control valve in fluid communication with the first conduit, the second conduit, a hydraulic oil supply line, and an oil return line, the directional control valve being configured to:
        selectively switch between a first flow position and a second flow position,
        establish, in the first flow position, a fluid communication path from the hydraulic oil supply line to the first conduit, concurrent with a fluid communication path from the second conduit to the oil return line; and
        establish, in the second flow position, a fluid communication path from the hydraulic oil supply line to the second conduit, concurrent with a fluid communication path from the first conduit to the oil return line;
    a valve associated with the hydraulic oil supply line;
    a first flow meter, configured to detect a flow rate within the first conduit, and to generate a corresponding first signal;
    a second flow meter configured to detect a flow rate within the second conduit, and to generate a corresponding second signal; and
    a controller configured to receive the first signal and the second signal, the controller further configured to:
        calculate a relation between the first signal to the second signal; and
        cause the valve to inhibit flow within the oil supply line in response to the relation meeting a predetermined condition.

2. The system according to claim 1, wherein the controller is further configured to:
    calculate the relation as a ratio between the first signal and the second signal; and
    determine a difference between the ratio and a predetermined ratio, and
    wherein the predetermined condition comprises the difference exceeding a predetermined threshold.

3. The system according to claim 1, wherein the first flow meter comprises:
    a first flow meter chamber in fluid communication with the first conduit;
    a first flow meter piston disposed within the first flow meter chamber, movable in two directions responsive to a direction of drag force exerted by hydraulic oil flow through the first flow meter chamber; and
    a first flow meter linear displacement sensor, configured to detect a relative position of the first flow meter piston within the first flow meter chamber, and to generate the first signal based on the detected relative position of the first flow meter piston.

4. The system according to claim 3, wherein the first flow meter linear displacement sensor includes a linear potentiometer.

5. The system according to claim 3, wherein the first linear displacement sensor includes a linear variable differential transformer.

6. The system according to claim 1, wherein the second flow meter comprises:
    a second flow meter chamber in fluid communication with the second conduit;
    a second flow meter piston disposed within the second flow meter chamber, movable in two directions responsive to a direction of drag force exerted by hydraulic oil flow through the second flow meter chamber; and
    a second flow meter linear displacement sensor coupled with the second flow meter piston, the second flow meter linear displacement sensor configured to detect a relative position of the second flow meter piston within the second flow meter chamber, and to generate the second signal based on the detected position of the second flow meter piston.

7. The system according to claim 6, wherein the second flow meter linear displacement sensor includes a linear potentiometer.

8. The system according to claim 6, wherein the second linear displacement sensor includes a linear variable differential transformer.

9. A method for detecting leaks in a hydraulic supply system, the hydraulic supply system connected to a double-acting hydraulic actuator, the method comprising:
- establishing a fluid communication path from a hydraulic supply line, through a first conduit, to a first chamber of the double-acting hydraulic actuator, concurrent with a fluid communication path from a second chamber of the double-acting hydraulic actuator, through a second conduit and to an oil return line;
- detecting a flow rate of a hydraulic oil through the first conduit and generating a corresponding first signal;
- detecting a flow rate of a hydraulic oil through the second conduit and generating a corresponding second signal;
- detecting a relation between the first signal and the second signal; and
- selectively inhibiting flow within the oil supply line in response to the relation meeting a predetermined condition.

10. The method of claim 9, wherein:
the relation is a ratio between the first signal and the second signal, and
the predetermined condition is the ratio exceeding a predetermined threshold.

* * * * *